Dec. 20, 1955  G. D. DOWELL  2,727,373
KNITTING MACHINE

Filed July 1, 1952  16 Sheets-Sheet 1

INVENTOR.
George D. Dowell,
BY Paul & Paul
ATTORNEYS.

Dec. 20, 1955 G. D. DOWELL 2,727,373
KNITTING MACHINE
Filed July 1, 1952 16 Sheets-Sheet 6
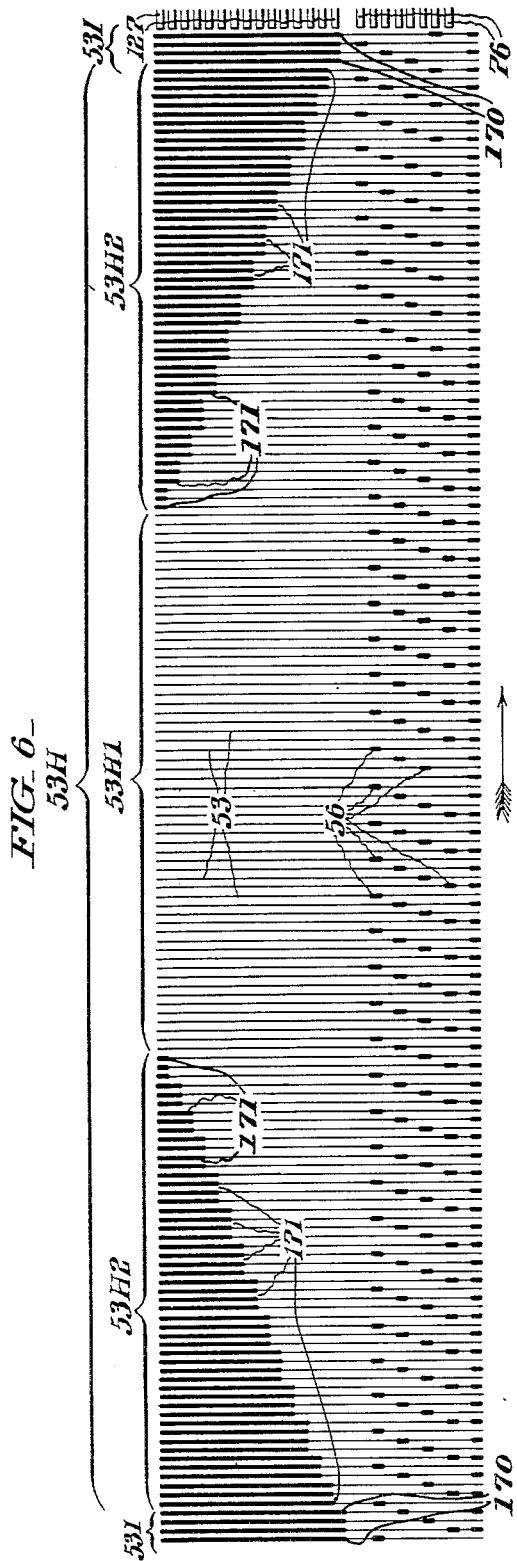
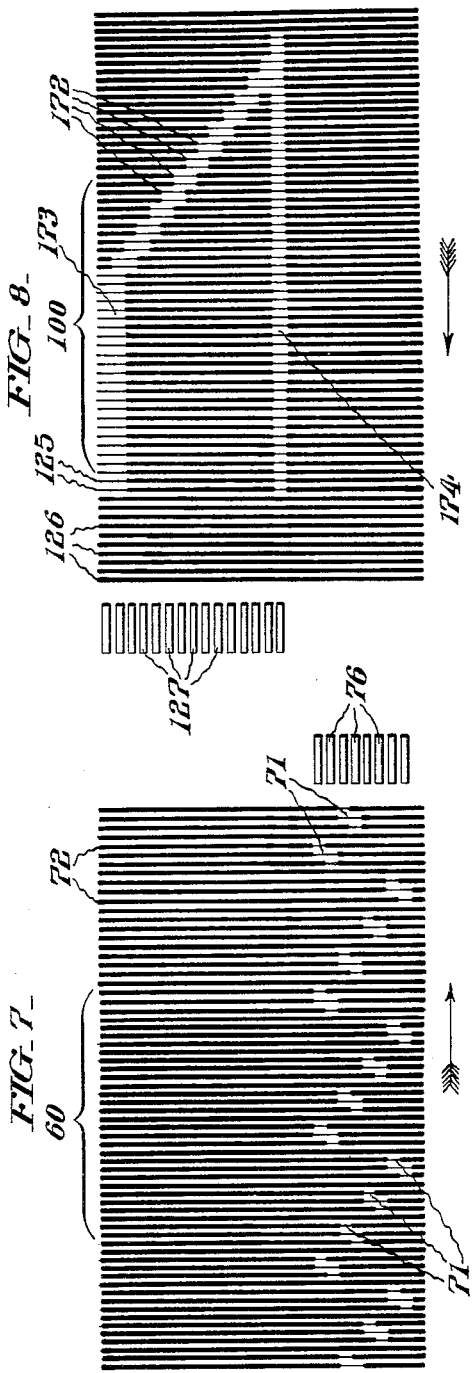
INVENTOR.
George D. Dowell,
BY Paul & Paul
ATTORNEYS.

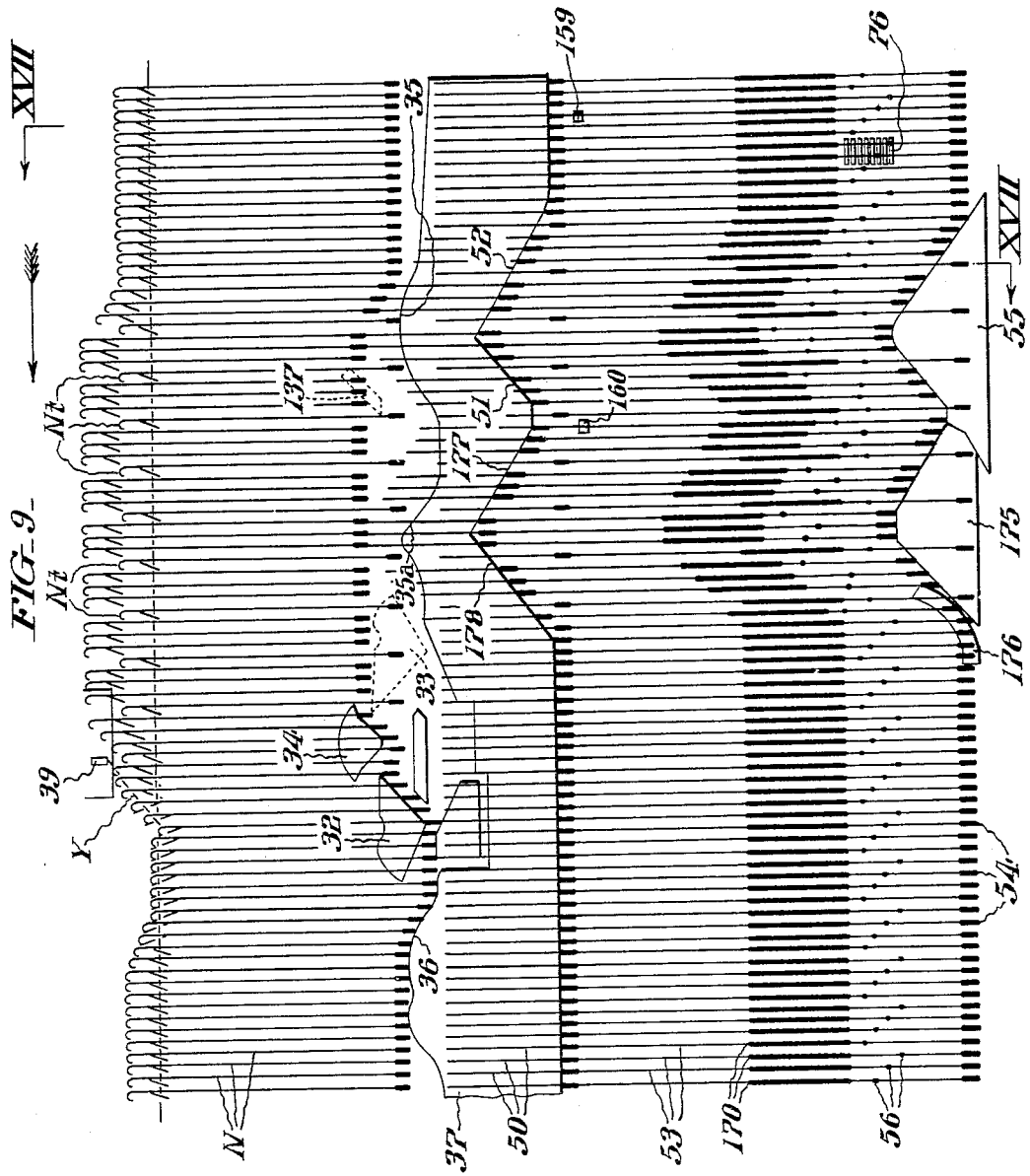

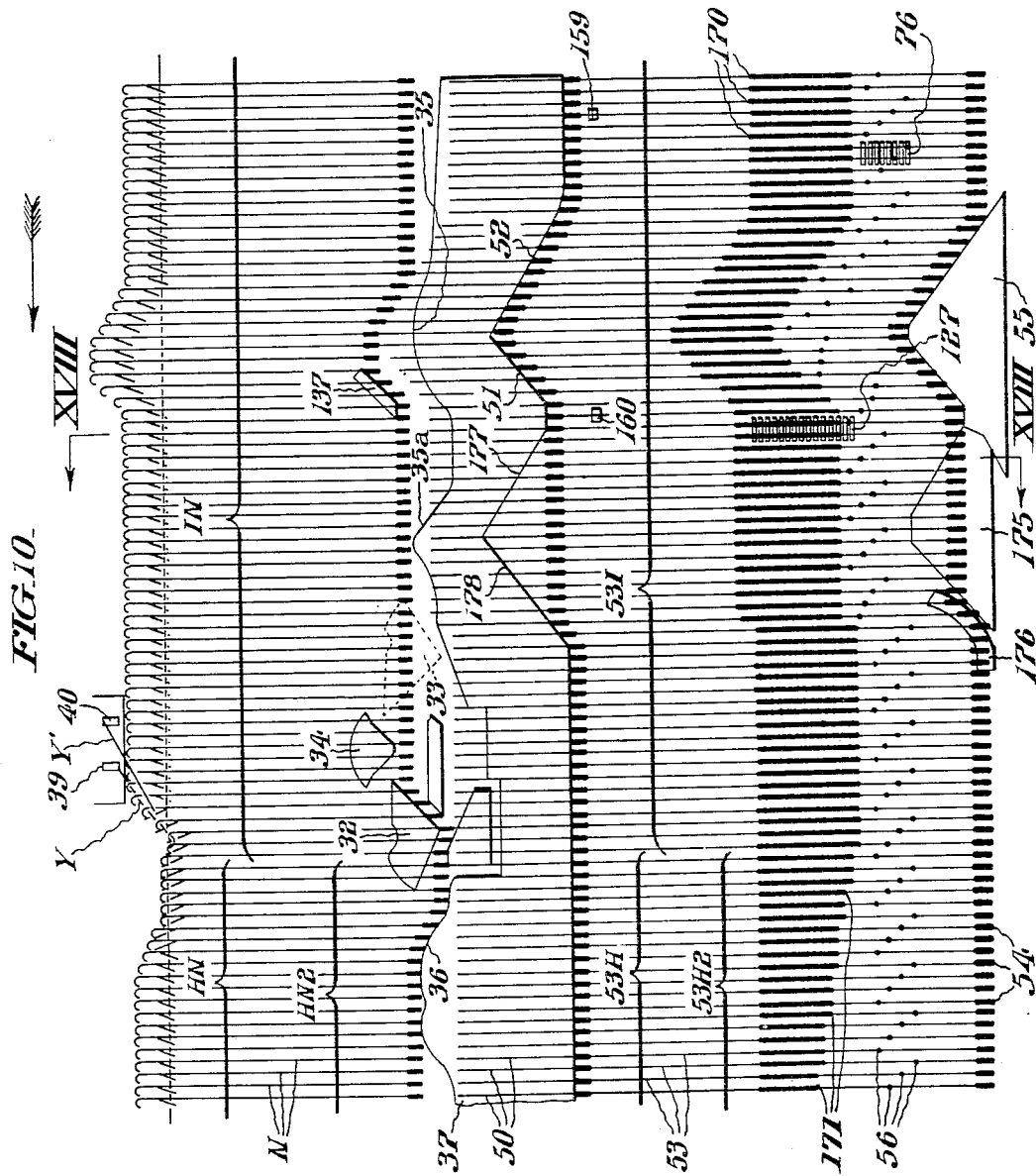

Dec. 20, 1955  G. D. DOWELL  2,727,373
KNITTING MACHINE
Filed July 1, 1952  16 Sheets-Sheet 9
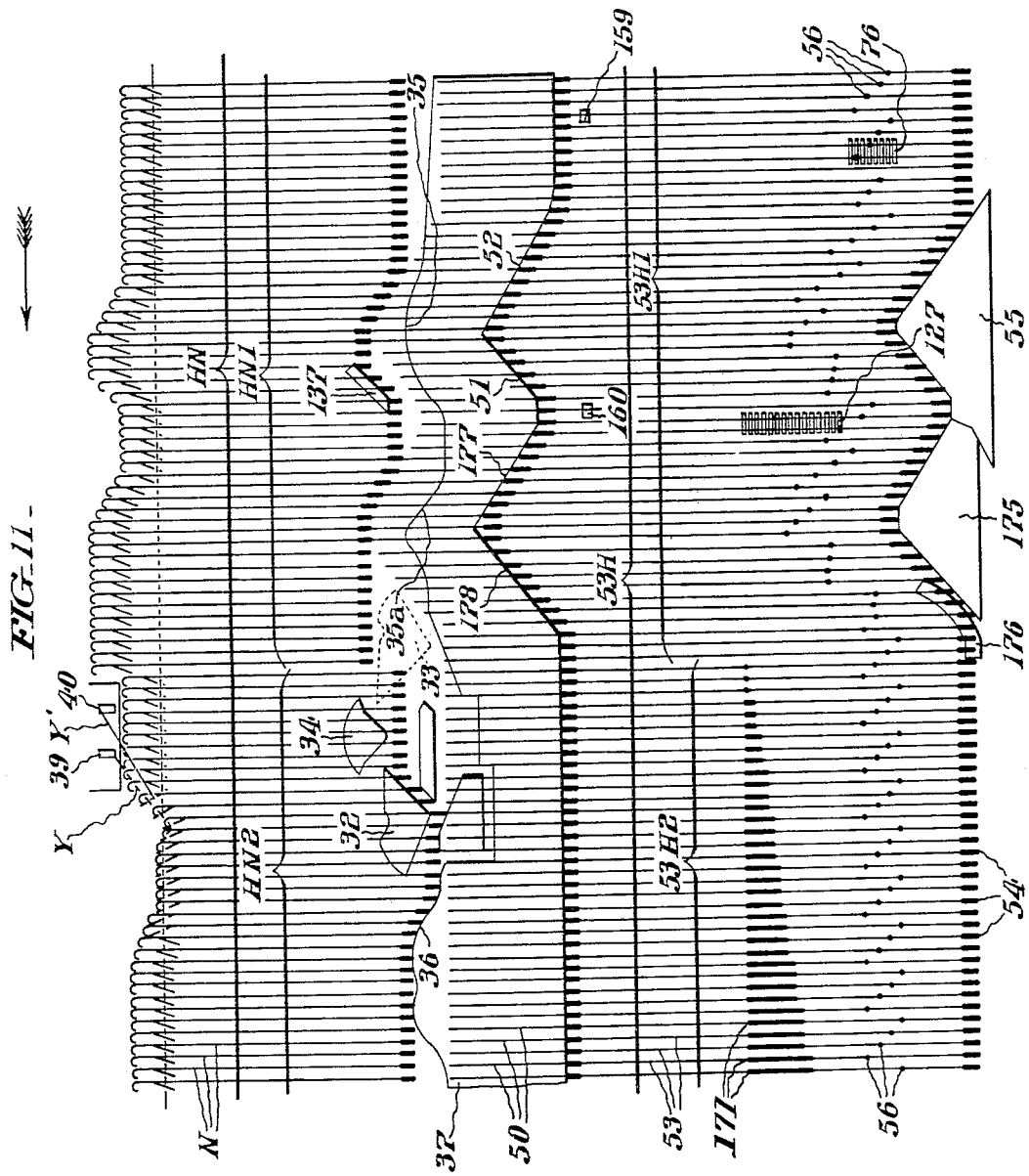
INVENTOR.
George D. Dowell,
BY Paul & Paul
ATTORNEYS.

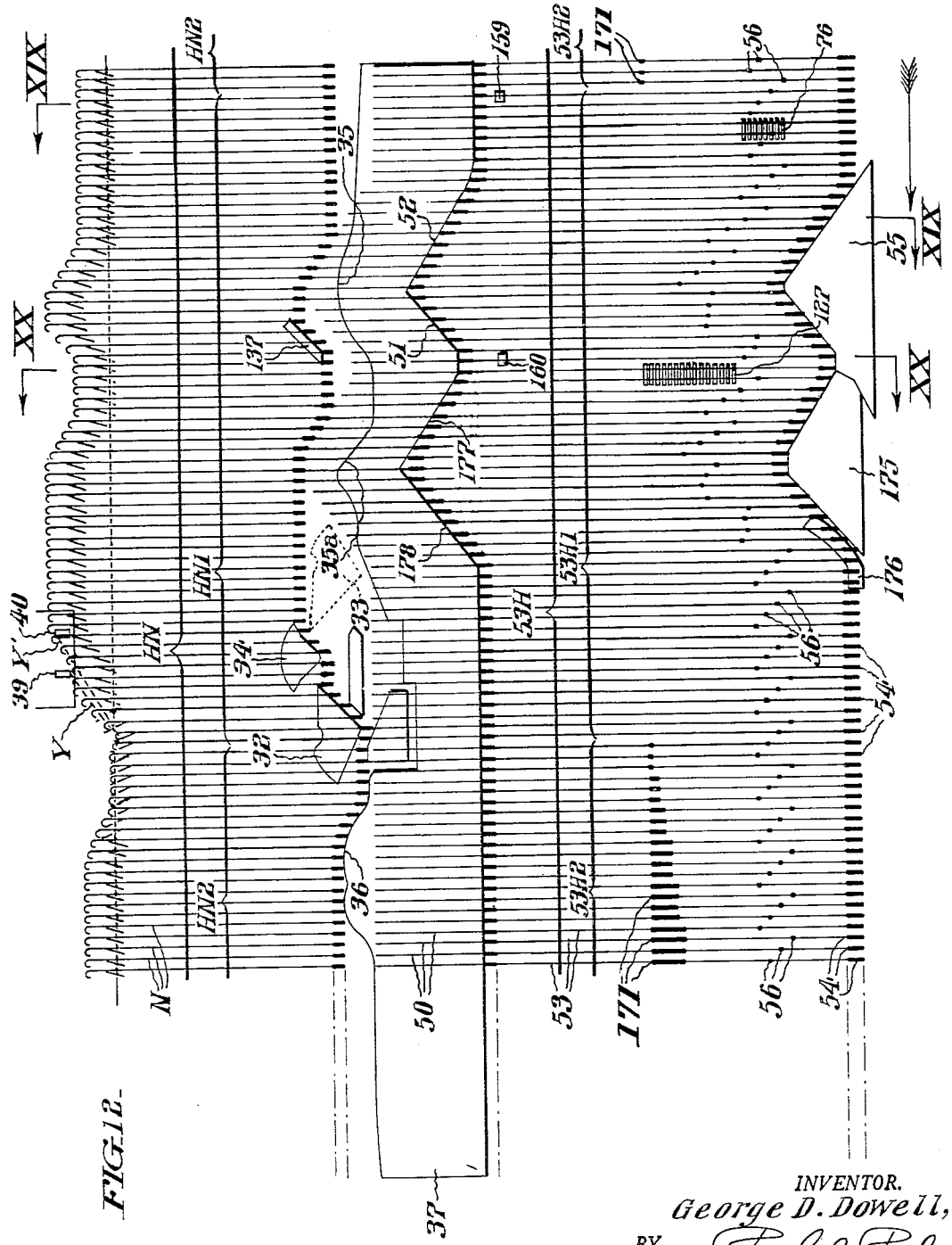

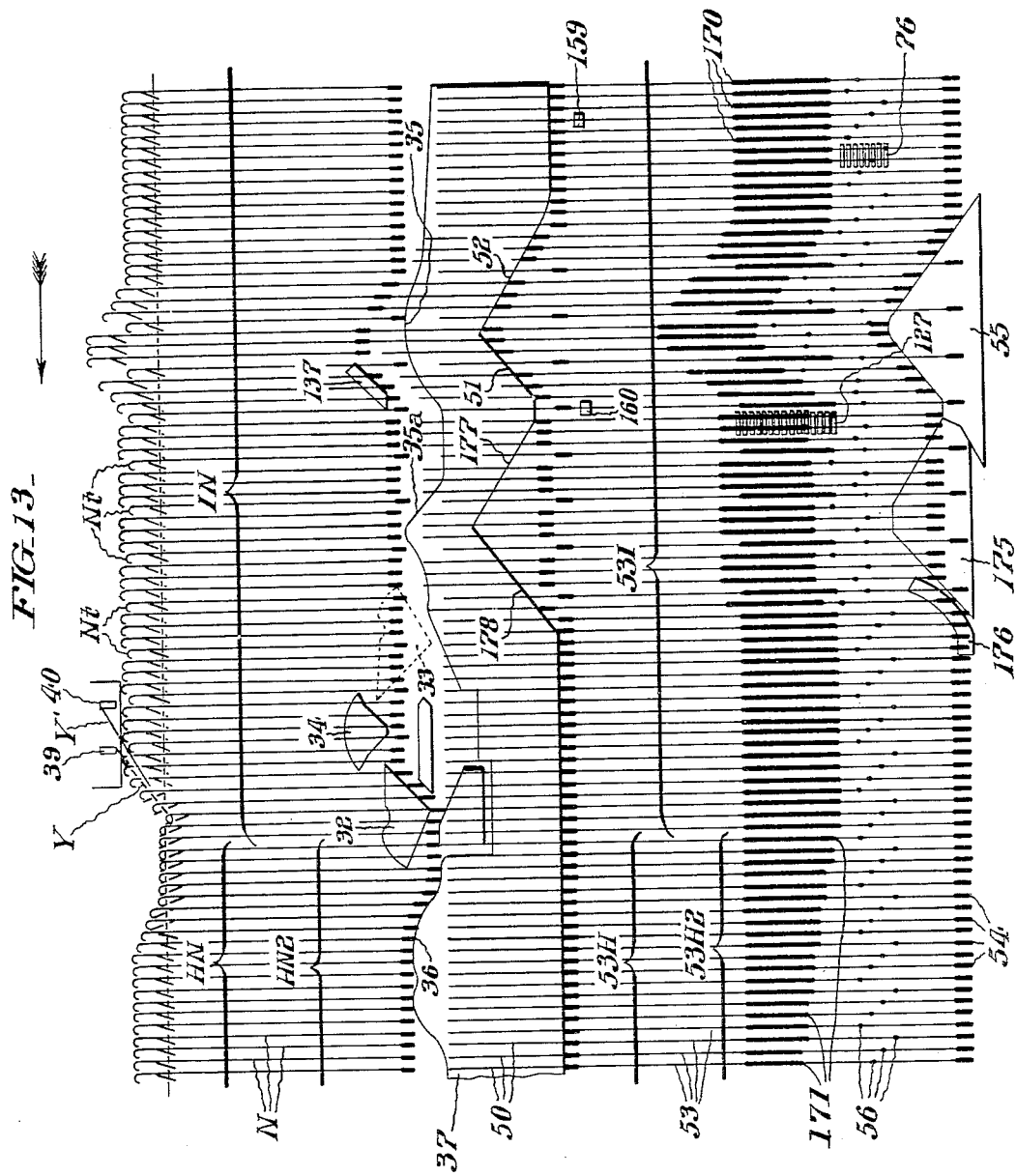

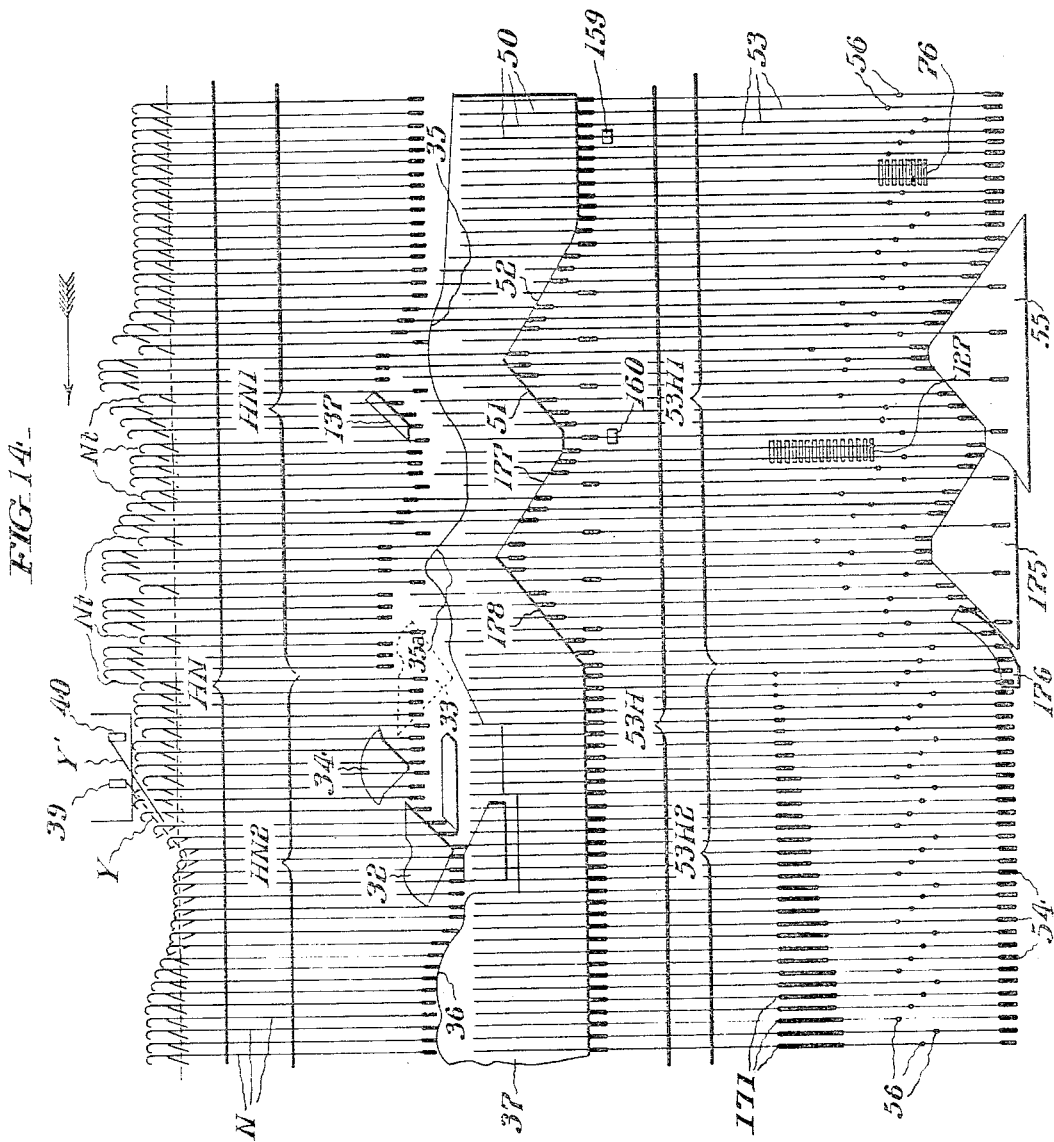

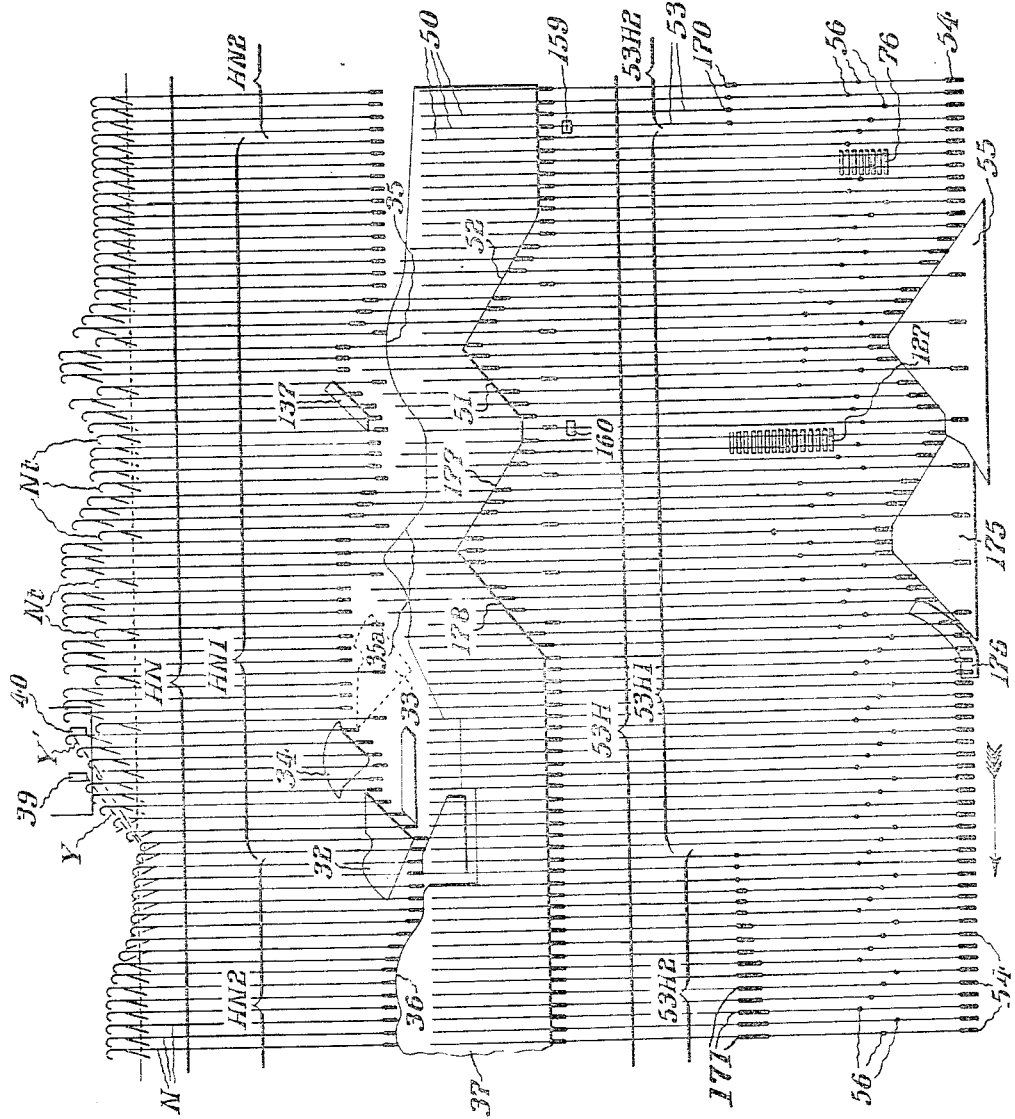

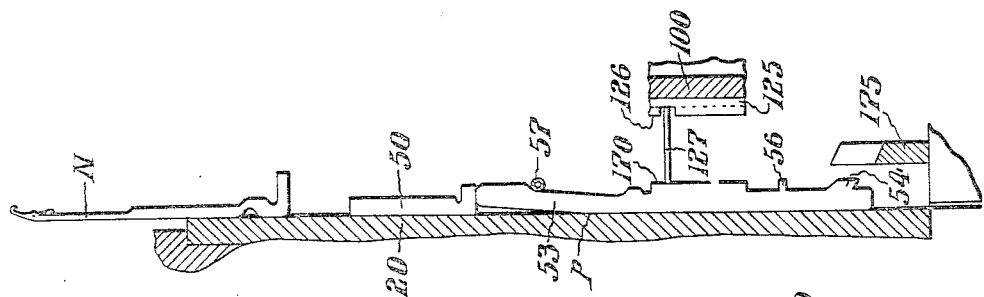
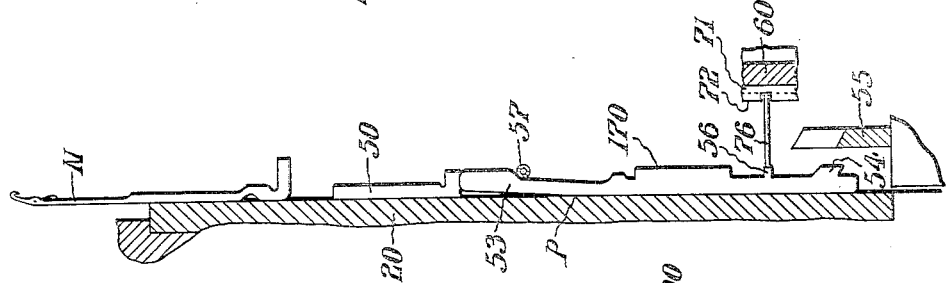
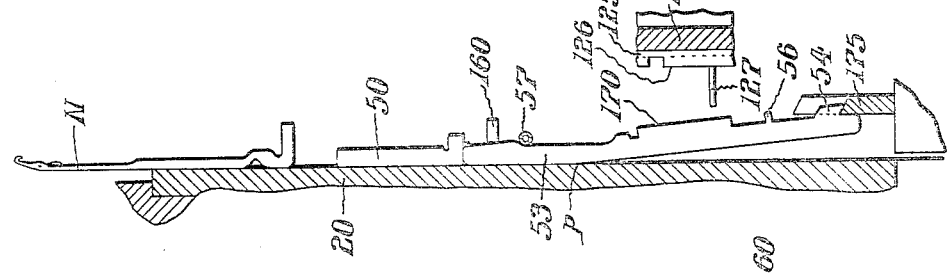
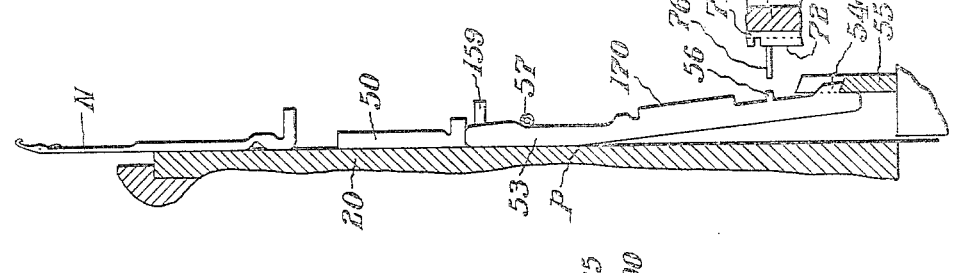
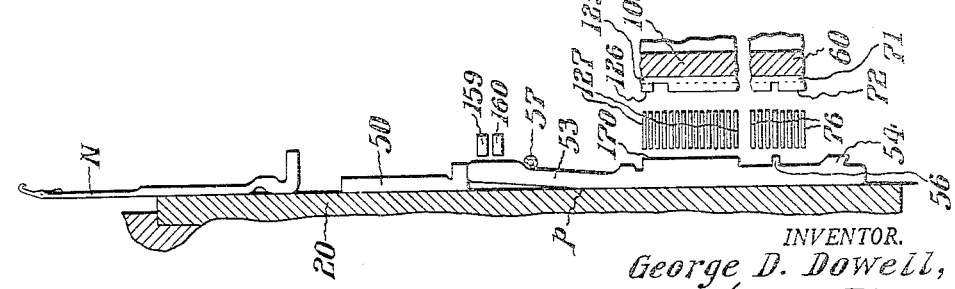
INVENTOR.
George D. Dowell,
BY Paul & Paul
ATTORNEYS.

Dec. 20, 1955  G. D. DOWELL  2,727,373
KNITTING MACHINE
Filed July 1, 1952  16 Sheets-Sheet 15

INVENTOR.
George D. Dowell,
BY Paul & Paul
ATTORNEYS.

Dec. 20, 1955     G. D. DOWELL     2,727,373
KNITTING MACHINE
Filed July 1, 1952     16 Sheets-Sheet 16
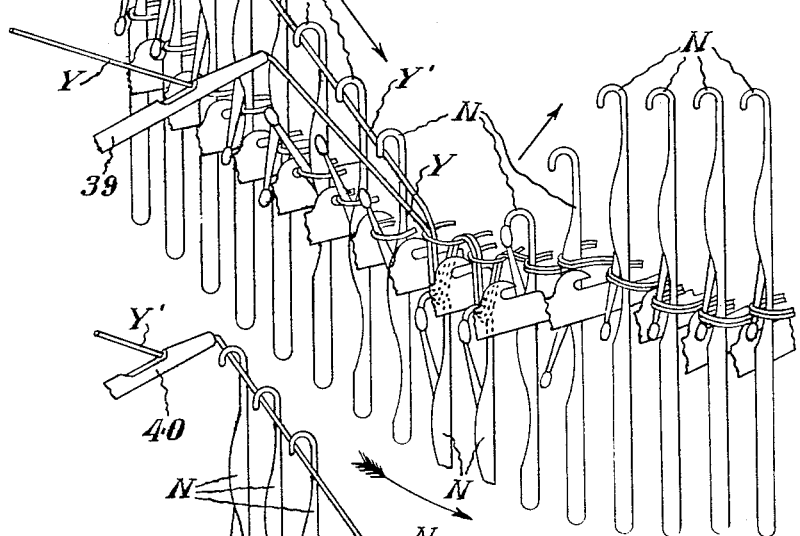
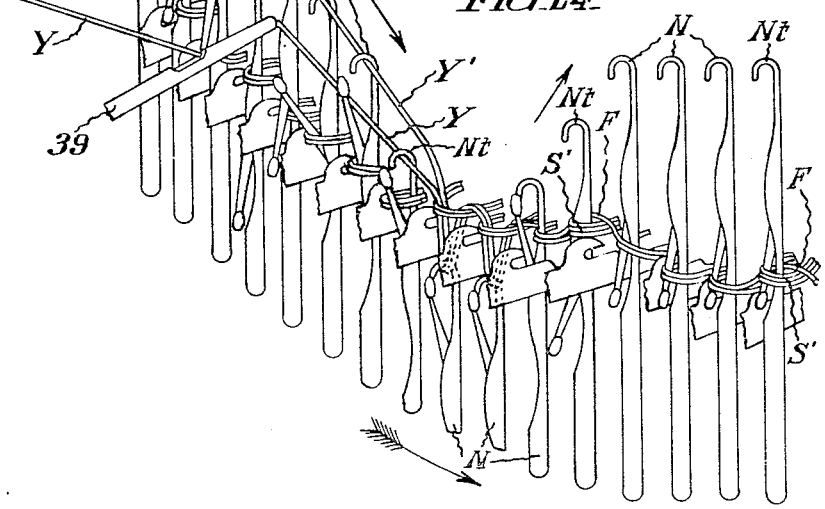
INVENTOR.
George D. Dowell,
BY Paul & Paul
ATTORNEYS

United States Patent Office 2,727,373
Patented Dec. 20, 1955

2,727,373
KNITTING MACHINE

George D. Dowell, Winston-Salem, N. C., assignor to Hanes Hosiery Mills Company, Winston-Salem, N. C., a corporation of North Carolina Application July 1, 1952, Serial No. 296,567

10 Claims. (Cl. 66—49)

This invention relates to knitting machines. More particularly, it is concerned with circular stocking knitting machines such as disclosed in U. S. Patent No. 1,969,853 granted to A. E. Page on August 14, 1934, for the production of seamless run-proof stockings characterized as in U. S. Patent No. 2,501,353 granted to the same inventor on March 21, 1950, wherein tuck stitches are formed in spaced needle wales in alternate courses and disposed in lines which extend diagonally of the leg and instep portions of the stockings.

The chief aim of my invention is to make possible in stockings of the kind referred to, the formation of either square or upwardly tapering reinforced areas above the heel pockets in which floats of the splicing or reinforcing yarn extend transversely of the back of the tuck stitches. This objective is realized in practice as hereinafter more fully set forth, through provision, for operation in an auxiliary capacity to the usual intermittently racked patterning drum through the medium of which the needles used for tucking are selected and controlled, of a second intermittently racked patterning drum through the medium of which the needles used in the high or advance heel splicing are selected for control in such manner that the splicing yarn will be floated behind the tuck loops in the spliced area; and through further provision of means for racking the auxiliary patterning drum at a different rate but in properly timed relation to said usual patterning drum.

Other objects and attendant advantages will appear from the following detailed description of the attached drawings wherein:

Fig. 6 shows, in linear development, the arrangement of the needle selecting jacks in the lower part of the needle cylinder corresponding to the heel knitting needles of the series.

Figs. 7 and 8 are similar views showing the arrangement of the reader cam lever actuating bars in the primary and auxiliary patterning drums.

Figs. 9–15 show, in linear development, how the needles are acted upon by the selecting jacks during the knitting of different portions of the stocking leg and ankle.

Fig. 16 is a fragmentary view of the needle cylinder in section showing the positional relationship between the primary and auxiliary patterning drums and the jacks by which variant selection of the needles is accomplished.

Figs. 17 and 18 are views similar to Fig. 16, taken as indicated respectively by the angled arrows XVII—XVII and XVIII—XVIII in Figs. 9 and 10.

Figs. 19 and 20 are views in turn like Fig. 16 taken as indicated respectively by the angled arrows XIX—XIX and XX—XX in Fig. 12.

Figs. 23 and 24 are perspective views showing how the body yarn and the splicing yarn are fed and knitted in the formation of different courses of the reinforced advance or high heel of the stocking.

Figure 1:
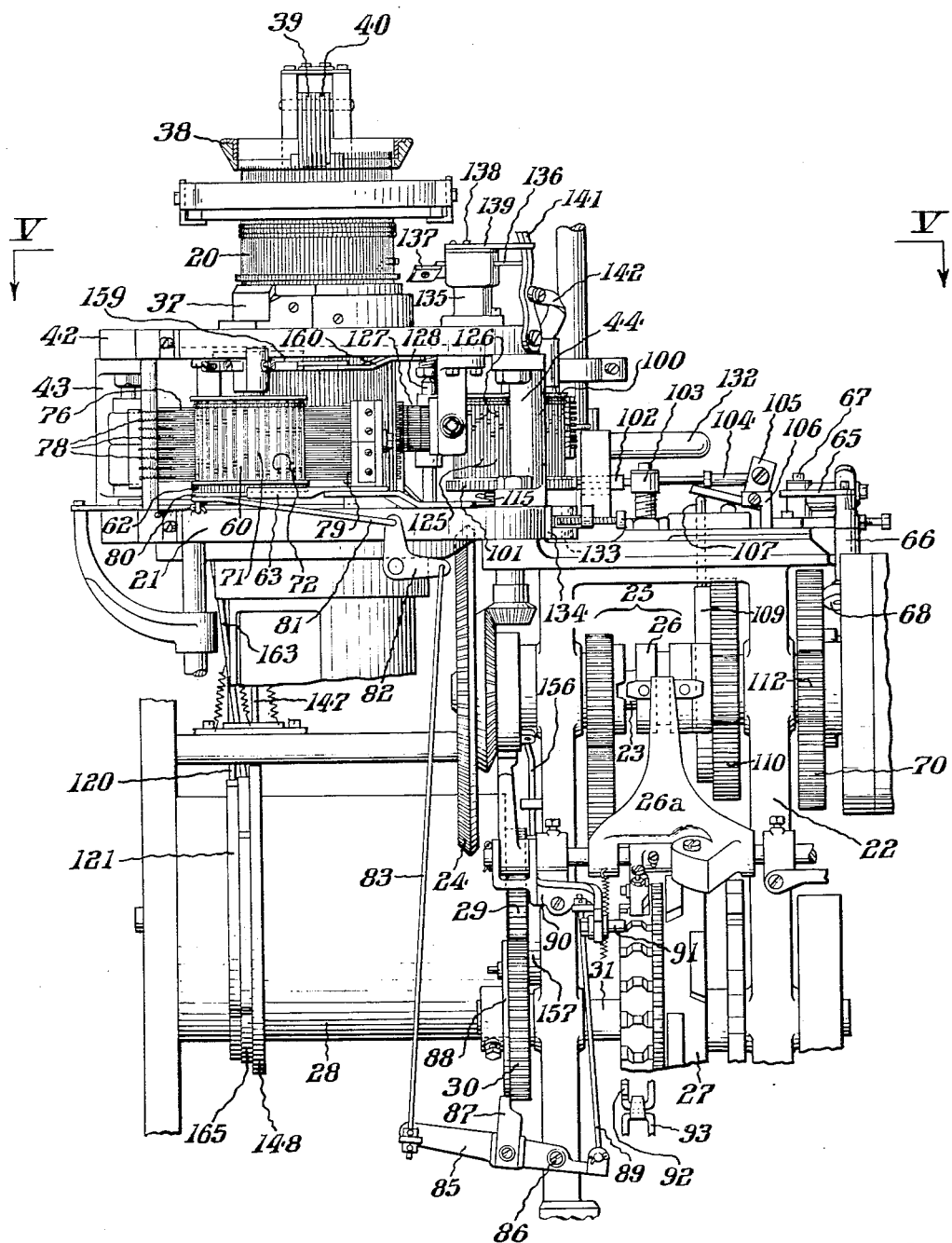
Fig. 1 is a fragmentary view, in front elevation, of a circular stocking knitting machine conveniently embodying the present improvements.

Basically, the knitting machine herein illustrated for convenience of exemplifying my invention is of the construction disclosed in the Page Patent 1,969,853, its needle cylinder 20 (Figs. 1–5) being rotatively supported in a bed 21 at the top of the machine frame 22, and driven from the main or pulley shaft 23 through a bevel gear 24 in mesh with a bevel gear at the bottom of said cylinder. Rotation and oscillation of cylinder 20 is effected in the customary manner as required for the production of seamless stockings, by a selective gear mechanism comprehensively designated 25. Included in this gear mechanism is a shiftable clutch 26 which is actuated from the usual main timing drum 27, the supplemental timing drum indicated at 28 being driven, through intermeshing gears 29 and 30, from the shaft 31 of said main drum. In the knitting, the needles generally designated N are actuated by cams (Figs. 9–15) including the usual main and auxiliary stitch cams 32 and 33, center cam 34, and the elevating rises 35, 35a and 36 on the cam ring 37, to form fabric loops from yarns served by feeds of which there are a plurality which are pivotally supported as usual for individual selection on the latch guard ring 38 (Fig. 1). Of these, I employ the feed designated 39 to feed a body yarn Y during the knitting of the stocking legs, and the one designated 40 to feed a splicing yarn Y' for reinforcing the tapering advance or high heel portions of the stockings as will be more fully explained later. As usual, the cam ring 37 is mounted on a second bed 42 supported at an elevation above bed 21 by posts 43 and 44. After customary practice, approximately half of the needles N are employed as heel knitting needles which are designated HN in Figs. 9–13, the remaining or instep needles being designated IN.

Figure 5:
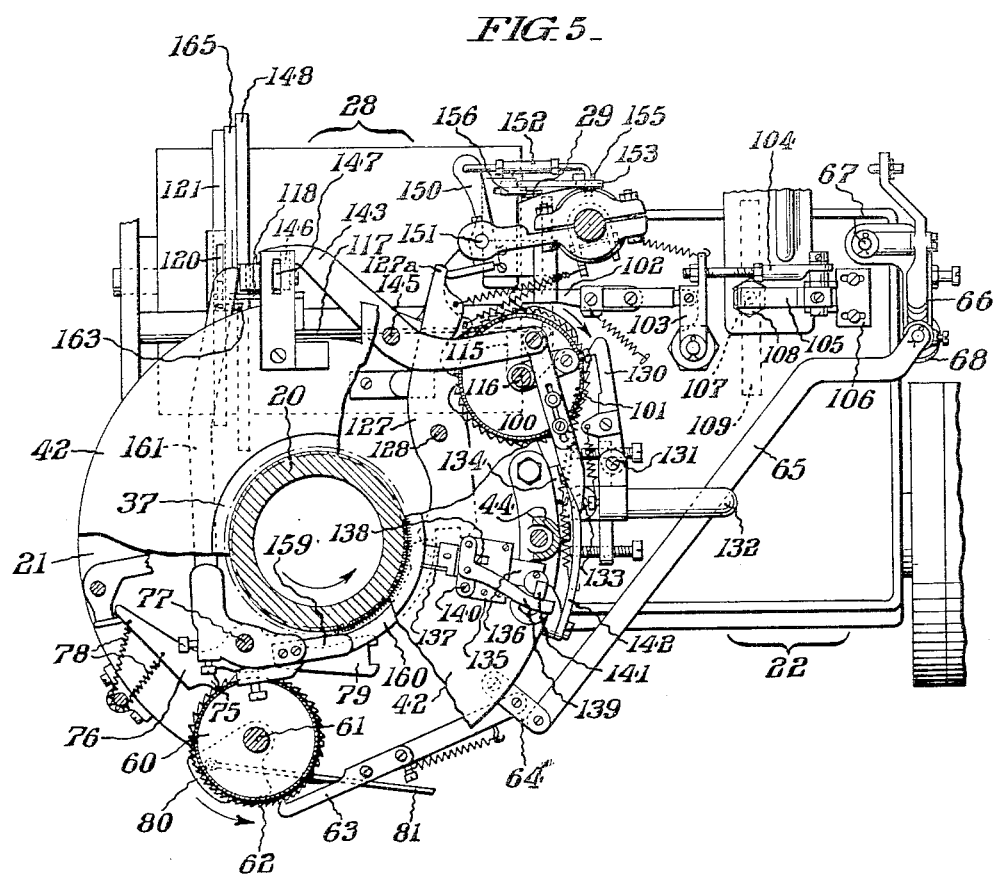
Fig. 5 is a horizontal section of the machine taken as indicated by the angled arrows V—V in Fig. 1.

Disposed beneath the needles N in the grooves of cylinder 20 are individual needle jacks 50 which are acted upon by the usual depressing incline 51 of the angular bight 52 in the bottom of cam ring 37; and beneath the needle jacks are individual selecting jacks 53 with rocking points $p$ medially of their height at the backs thereof. All of the needle selecting jacks 53 have, as usual, bottom butts 54 for cooperation with the usual lift cam 55 on the lower bed 21 of the machine, and above said butts are individually provided with smaller butts 56 which are arranged at different levels. A spring band 57 surrounding the needle cylinder 20 acts upon the selecting jacks 53 above their rocking points $p$ so that the lugs 54 at their lower ends are normally projected into the path of cam 55 as in Figs. 9–11. As in the Page Patent 1,969,853 supra, the machine is equipped with a small patterning drum 60 having circumferentially arranged butted bars, said drum being mounted to revolve about a fixed axis post 61 upstanding from bed 21, and having a ring of ratchet teeth 62 at the bottom adapted to be picked by a pawl 63. Through a linkage system 64, 65 (Figs. 1, 3 and 5), pawl 63 is connected to a yoked arm 66 fulcrumed at 67 on the frame 22 and carrying a roller 68 which is shiftable into the path of one or the other of two concentric groups of circumferentially spaced cams 69 and 69a on the face of a bull gear 70 embodied in the gear mechanism 25. Set into longitudinal circumferential grooves in patterning drum 60 are bars 71 with stepped voids 72, see Fig. 7, at different levels in the path of projections 75 of reader cam levers 76 which are disposed at elevations corresponding to the levels of the butts 56 on the needle selecting jacks 53, said levers 76 being fulcrumed for independent movement about a fixed stud 77 upstanding from bed 21. The reader cam levers 76, see Fig. 5, are subject to individual springs 78 whereby their projections 75 are yieldingly maintained in engagement with drum 60. As the butts on the bars of drum 60 engage the projections 75 of reader cam levers 76, the cam ends 79 of the latter are withdrawn from the path of corresponding butts 56 on the needle selecting jacks 53 in the usual manner. The activity of pawl 63 is controlled by a guard 80 which is fulcrumed beneath drum 60 on the stud 61 about which said drum rotates, and is connected through a linkage 81, 82 and 83 (Fig. 1) with a lever 85 pivoted on frame 22 at 86. One arm of lever 85 has a finger projection 87 in the path of a disk cam 88 on gear wheel 30, the other arm of said lever being connected, by a link 89, to a yoked lever 90 free on the shaft of the shifter 26a of clutch 26 which has a lateral stud projection 91 in the path of high links 92 on the measuring chain 93 of the machine.

Figure 4:
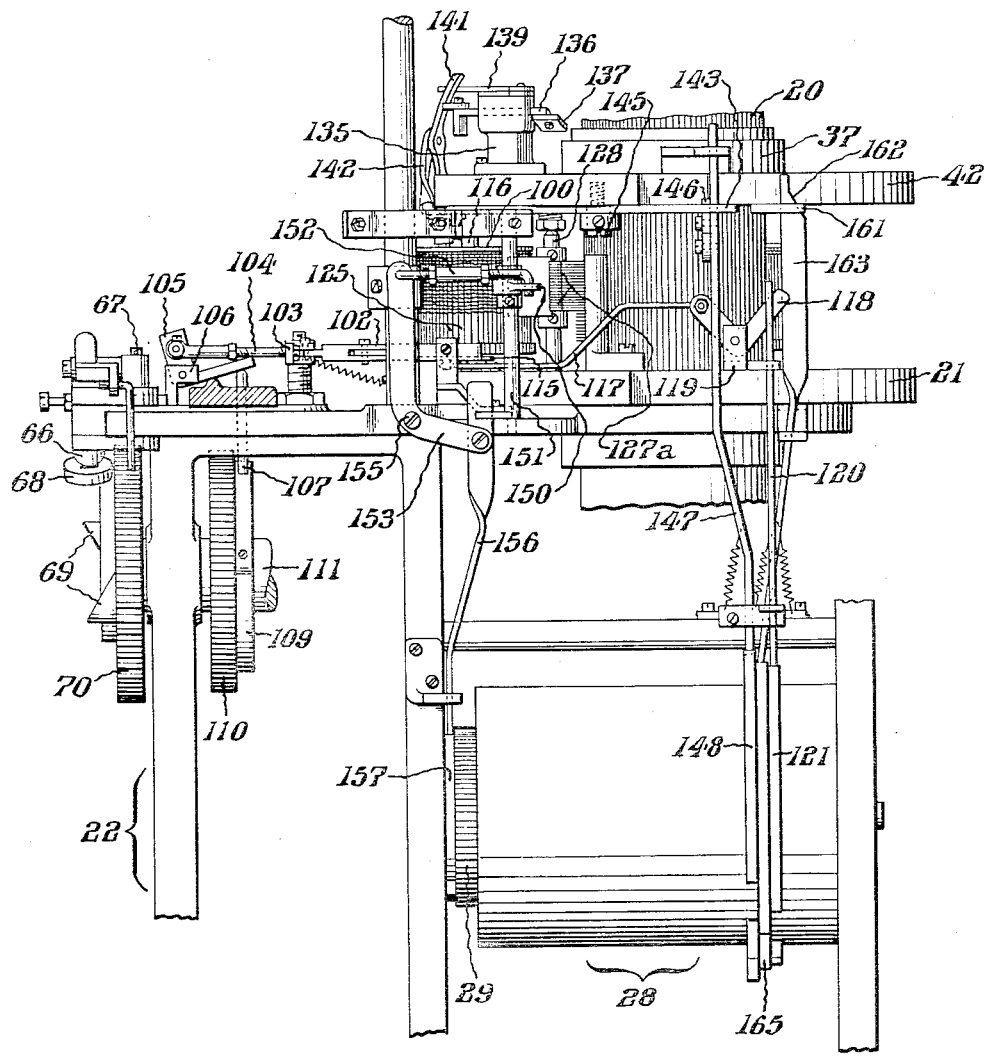
Fig. 4 is a broken out fragmentary view showing the machine in rear elevation.

In adapting a machine, such as briefly described above to the purposes of my invention, I provide a second or auxiliary patterning drum which is comprehensively designated 100, and which is located further around the needle cylinder 20 in the direction of cylinder rotation as shown in Fig. 5. Auxiliary patterning drum 100 is identical in construction with patterning drum 60 in that it has ratchet teeth 101 at the bottom for intermittent rotation by a separate pawl 102. As shown in Figs. 1, 4 and 5, pawl 102 is connected, through parts 103 and 104, to the upright arm of a bell crank lever 105 fulcrumed in a bracket 106 on the top plate of machine frame 22. The horizontal arm of bell crank lever 105 overlies the upper end of a plunger 107 which is constrained to axial up and down movement in a guide bearing 108 set into the top plate of frame 22, and which rides upon a disk cam 109 at the back of a gear wheel 110 of mechanism 25 on the shaft 111 of bull wheel 70. The ratio between bull wheel 70 and the intermeshing drive pinion 112 on main shaft 23 is four to one. Accordingly, auxiliary patterning drum 100 is racked once every second revolution of main shaft (i. e. every second course of the knitting), while the usual or primary patterning drum 60 is racked twice in every course of the knitting by reason of the eight cam projections 69 and 69a on bull wheel 70. The activity of pawl 102 is controlled by a guard 115 pivoted on the axis stud 116 of drum 100 beneath the latter. By means of a horizontal link 117 (Figs. 2, 4 and 5), pawl guard 115 is connected to the upright arm of a bell crank lever 118 pivoted on another bracket 119 atop the machine frame, the other arm of said lever being connected to the top end of a thrust bar 120 which rides upon a cam ridge 121 on supplemental timing drum 28 at the back of the machine. Like primary patterning drum 60, auxiliary patterning drum 100 is provided with bars 125 whereof the butts 126 are variantly arranged vertically to act upon similarly arranged reader cam levers 127 which, in turn, act upon certain butts of the needle selecting jacks as also later explained, see Fig. 16. The auxiliary reader cam levers 127 are individually spring biased toward drum 100, and independently fulcrumed about another upstanding stud 128 on bed 21.

Figure 3:
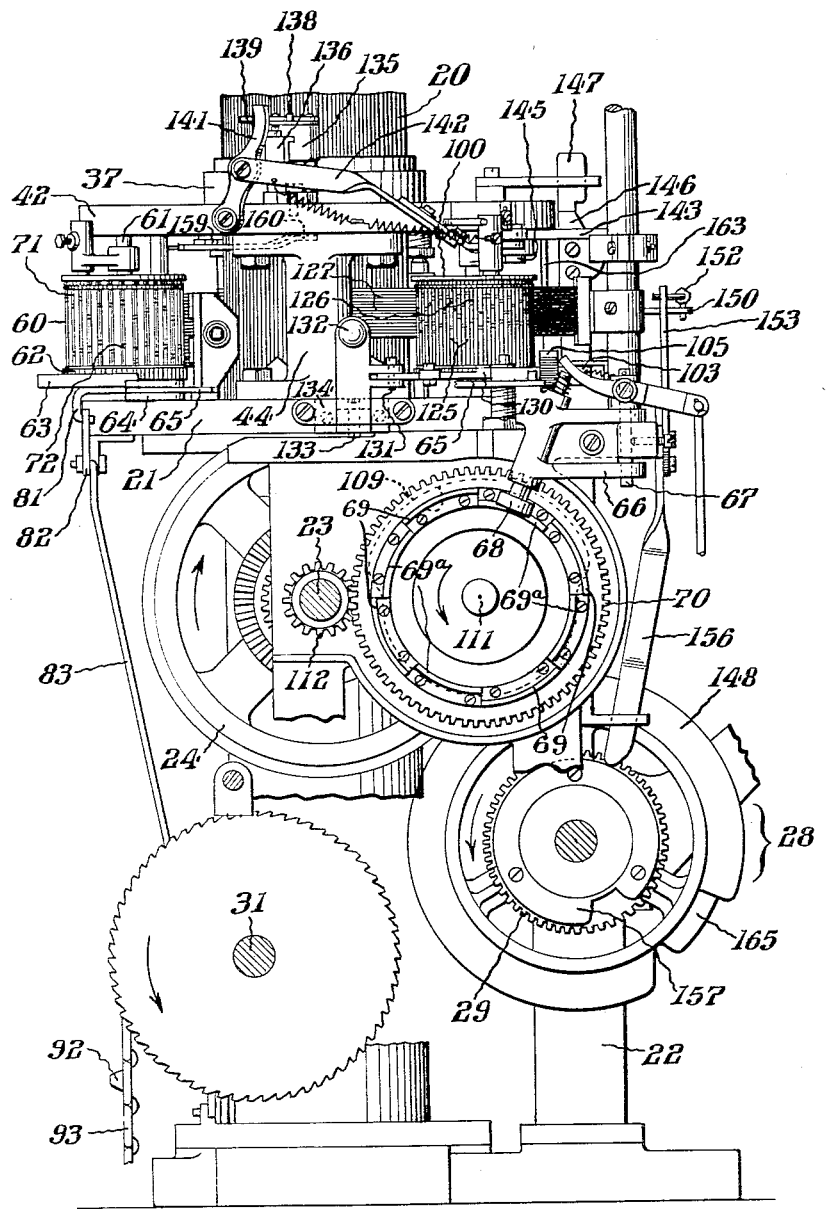
Fig. 3 is a fragmentary view showing the machine in end elevation as viewed from the right of Fig. 1, with the belt pulleys removed from its drive shaft.

For re-setting, in case this should be necessary at any time, auxiliary patterning drum 100 can be racked manually by means of a supplemental pawl 130 which, as shown in Figs. 3 and 5, is pivotally connected at 131 to a hand lever 132 fulcrumed at 133 on a bracket 134 at the edge of bed plate 21.

Figure 2:
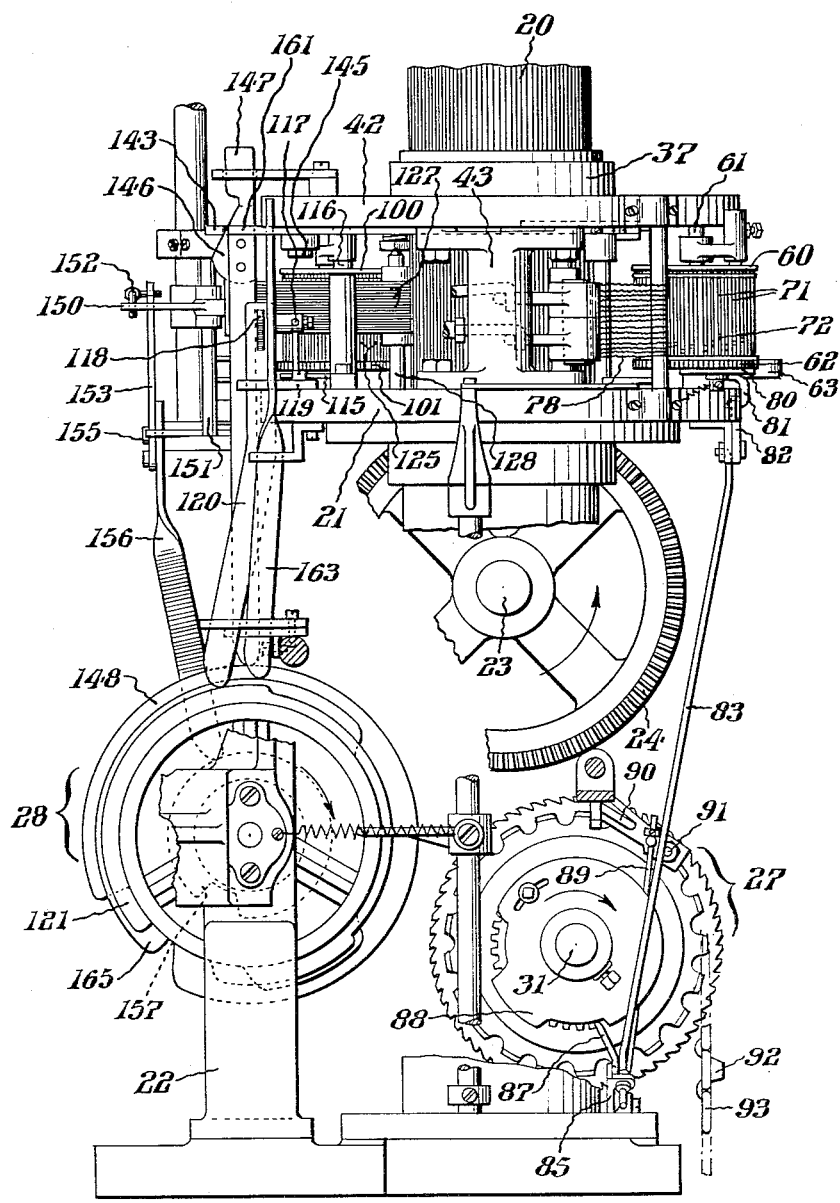
Fig. 2 is a similar broken out view showing the machine in end elevation as viewed from the left of Fig. 1.

Constrained to endwise movement radial to the needle cylinder 20 in another bracket 135 on the top of bed plate 42 (Fig. 5) is an inwardly spring biased slide 136 which, at its inner end, carries a special depressing cam 137 for action upon the needles for a purpose also later explained. Projecting through a slot in the top of bracket 135 is a stud 138 which is engaged by a lever 139 fulcrumed at 140 on said bracket. The distal end of lever 139, engages the upper end of an upright finger 141, see Figs. 3, 4 and 5, which is pivoted on the edge of bed 42 and which is connected, by a link 142, to one end of horizontal lever 143, the latter being pivoted medially at 145 to said bed at the bottom. The other end of lever 143, see Figs. 2 and 5, is in the path of a cam projection 146 on still another thrust rod 147 whereof the lower end bears upon a separate cam ridge 148 on supplemental timing drum 28. From Figs. 9-15 it will be observed special cam 137 is located directly over the depressing cam incline 51 hereinbefore referred to.

During the knitting of the calf portions of the stockings, the auxiliary reader cam levers 127 are held in the retracted inactive positions in which they are shown in Fig. 5, by a stop element 150 which has a straight edge to engage the tail ends 127a of said levers. Stop element 150 is in the form of an arm fulcrumed to turn about a fixed upright pivot axis 151. By means of a link 152, arm 150 is coupled with one extremity of a bell crank lever 153 fulcrumed at 155 on machine frame 22, the other arm of said lever being connected to a third thrust rod 156, see Figs. 2 and 4, which bears on still another cam ridge 157 on supplemental timing drum 28.

To the usual short finger 159 at the top of the pivot stud 77 for the reader cam levers 76 associated with the primary patterning drum 60, I have secured an extension 160 which reaches well around the needle cylinder to a point beneath special cam 137, see Figs. 3 and 5. As shown, finger 159 has, at right angles, a rearwardly extending arm 161 whereof the distal end is in the path of a cam projection 162 on a fourth vertical thrust rod 163 that bears upon a cam ridge 165 on supplemental timing drum 28.

In order that they may all be actuated upon the reader cam levers 127 under control of auxiliary patterning drum 100, the selecting jacks 53 corresponding to the instep needles designated IN are all provided with butts 170 which are of the same length considered vertically. The selecting jacks 53H1 corresponding to a mid group HN1 of the heel knitting needles HN, which are used for the upper parallel edged portion of the advance heel area in Fig. 20 as presently explained, have butts of the type 56 only. The selecting jacks 53H2 corresponding to the heel needles of two end groups HN2 which are used for the tapered portion of the advance heel area, have upper butts 171 which are graduated in length vertically, a size change taking place at every fourth jack. From Fig. 8 it will be noted that the bars of the auxiliary patterning drum 100 are so arranged as to provide stepped voids 172 on a slope vertically between short and long upper and lower horizontal voids 173 and 174, said voids being at levels corresponding to the stepped levels of the butts 171 on the needle selecting jacks 53H2, and being at the levels of the different reader cam levers 127.

Immediately in advance of cam 55 (Figs. 9-15), as considered with respect to the direction of cylinder rotation I have provided an auxiliary needle jack lifting cam 175, and beyond the latter a guard cam 176, the exact functioning of which will likewise be explained later. Further in accordance with my invention, the needle cam ring 37 is provided above auxiliary cam 175 with a second angular bight 177 which affords a depressing cam edge 178 for action upon the butts of the needle jacks 50.

Figure 22:
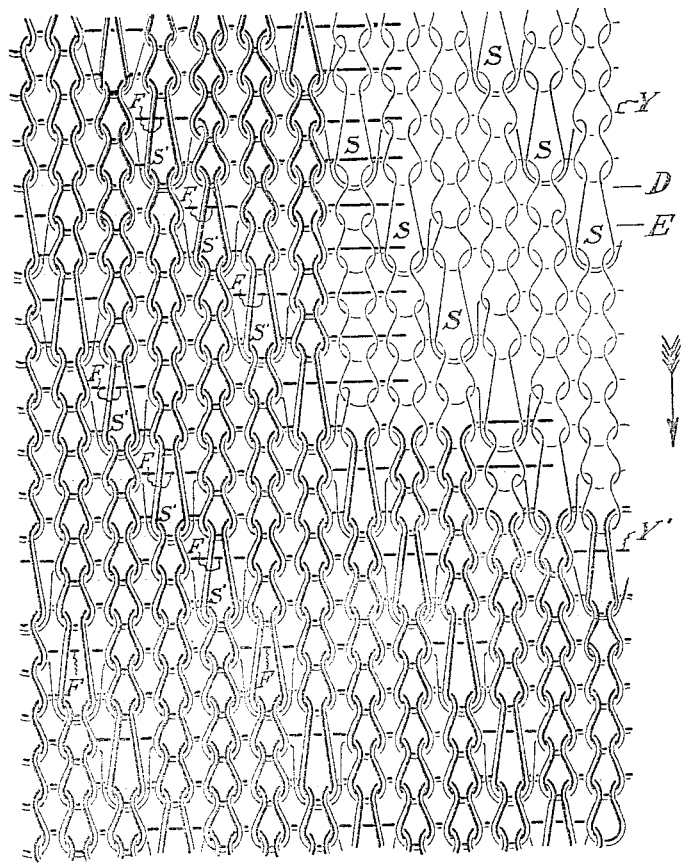
Fig. 22 shows, on an enlarged scale, the character of the stocking fabric within the broken line rectangle in Fig. 21.
Figure 21:
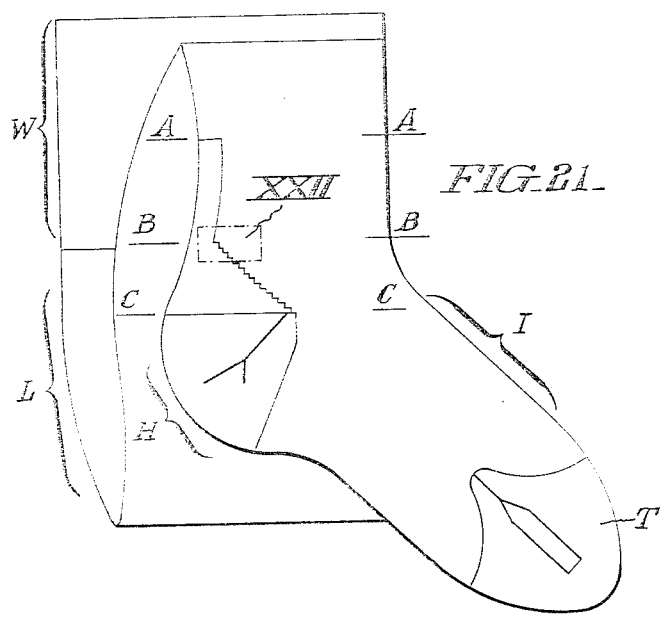
Fig. 21 shows a stocking with a reinforced advance or high heel for the production of which my improved machine is devised.

The stocking illustrated in Fig. 21 is generally like the one disclosed in the Page Patent 2,501,353 in that it has a turned welt W at the top, leg and instep portions L and I in which tuck stitches, such as designated S in Fig. 22, occur in every fourth needle wale in every other course, and in which said stitches are disposed along lines diagonally of the fabric. The stocking here, however, has an advance or high heel area above the usual heel pocket H, which area is reinforced, by use in the knitting, of the splicing yarn Y' (Fig. 22) in addition to the body yarn Y. As exemplified, the upper portion of the reinforced area between the courses A—A and B—B is relatively narrow and parallel edged, while the lower portion gradually widens downwardly stepwise from the course B—B to course C—C at which the heel pocket H begins. It is to be particularly noted from Fig. 22, that in the reinforced area, floats of the splicing yarn Y' extend crosswise of the back of the tuck loops S'.

*Operation*

Upon completion and closing of the welt W of the stocking in the usual well-known way, a rotary shift is imparted to supplemental timing drum 28 whereby guard 80 is retracted for release of pawl 63 to begin racking primary patterning drum 60. Knitting of the stocking leg L thereupon proceeds, with the main yarn Y alone fed to the needles as in Fig. 9, to the course A—A in Fig. 21. Due to the arrangement of the voids in the bars of primary patterning drum 60, the reader cam levers 76 are successively actuated in proper sequence to operate upon the butts 56 of the needle selecting jacks 53 after the manner shown in Fig. 17. As the needle selecting jacks 53 reach the fingers 159 and 160, they are all tilted about their fulcra, and their lower ends thereby thrust outward into the range of cams 55 and 175 as in Figs. 19 and 20. Individual selecting jacks 53 having butts 56 at the level of the particular reader cam levers 76 set at the time by drum 60, will be depressed so as to pass to the rear of cams 55 and 175 as in Figs. 9 and 17, the corresponding needles Nt being thereby allowed to remain at the tuck level as shown in Fig. 9. All of the remaining needle selecting jacks 53 however, will ride up cam 55 and the corresponding needles N will be thereby elevated to latch clearing level. The needles N thus elevated will take the body yarn Y at the feeding station and be actuated by the cams 34 and 32 to draw new loops through the loops of a previous fabric course. The low needles Nt will also take the yarn Y, but notwithstanding depression by stitch cam 32, will not cast the loops previously formed upon them. In the next course of the leg knitting, when no needle selection takes place, the needle selecting jacks 53 are all raised by lift cam 55 and the corresponding needles elevated to latch clearing level to take body yarn Y which will be formed into loops as the needles are drawn down by stitch cam 32, with incidental tucking of the loops held by the needles Nt during the knitting of the immediately preceding course. Due to the arrangement of the butts 56 on the needle selecting jacks 53 and successive actuation of the reader cam levers 76 by the primary patterning drum 60, tuck stitches S will be formed in this instance, on every fourth needle in every other course of the fabric, with said stitches extending diagonally of the fabric as shown in Fig. 21 in exactly the same manner as described in the Page Patent 2,501,353.

When course A—A in Fig. 21 is reached, the splicing yarn feed 40 is introduced as in Fig. 10 and, by a concurrent rotary shift of supplemental timing drum 28, special needle-depressing cam 137 is moved into active position, and guard 115 is retracted to permit racking of auxiliary patterning drum 100 by pawl 102. Also, at the same time, stop element 150 is retracted to release the reader cam levers 127 in readiness for actuation by auxiliary patterning drum 100 during the knitting of the portion of the stocking ankle between courses A—A and C—C in Fig. 21 in which the reinforced advance heel area is involved. Due to the lack of upper butts on the group 53H1 (Fig. 6) of the needle selecting jacks 53 of the heel needle series 53H, and to the upper horizontal void 173 (Fig. 8) in auxiliary patterning drum 100, the splicing is accomplished for a time by the mid group HN1 of the heel needles HN alone to form the parallel edged upper portion of the advanced heel area between the courses A—A and B—B in Fig. 21. Figs. 10, 11 and 12 taken together show how a course D (Fig. 22) of the fabric is formed, during which no needle selection is indicated under the influence of main patterning drum 60, but the uppermost reader cam lever of the series 127 controlled by auxiliary patterning drum 100 acts after the manner shown in Fig. 18 to displace the needle selecting jacks of groups 53H1 and 53H2 from the range of cam 175. The corresponding needles IN and HN2 will thus pass behind cam 175 as in Fig. 10 after said needles have been depressed by special cam 137 upon clearance of their latches, to a level at which they will take body yarn Y but miss splicing yarn Y' when they reach the feeding station. The jacks of the group 53H1, however, will ride up auxiliary lift cam 175 as in Figs. 11 and 12 and so again elevate the needles of the mid heel group HN1 to latch clearing level after they have been depressed by special cam 137, so that said needles will take both the body yarn Y and the splicing yarn Y' when they reach the feeds 39 and 40, after the manner shown in Fig. 23.

Figs. 13, 14 and 15, taken together, show how a course E (Fig. 22) of the fabric is formed. Here needle selection is indicated under the influence of main patterning drum 60 as in Fig. 17, whereby individual selecting jacks 53 corresponding to the needles Nt are permitted to pass behind cams 55 and 175 so that said needles will remain at tuck level, while all of the other needle jacks in the cylinder ride up lift cams 55 and 175 and so elevate their needles to latch clearing level. It is to be understood that, during the knitting of course D, a selection was indicated under influence of auxiliary patterning drum 100, as in the previous course, whereby the selecting jacks 53H1 corresponding to the HN1 needles were raised by cam 175 and said needles reelevated to latch clearing level after having been depressed by special cam 137, so that said needles will take both the yarn Y and the yarn Y' at the feeding station as in Fig. 14, but the tuck needles Nt in these groups will miss splicing yarn Y' and take yarn Y only, after the manner shown in Fig. 24. From the latter illustration, it is to be particularly noted that as the needles rise after drawing their loops, the needles Nt will pass up to the front of the auxiliary yarn Y', with consequent formation of the floats F of said yarn crosswise of the rear of the tuck loops S' in Fig. 22.

During the knitting of the fabric between the courses B—B and C—C in Fig. 21, the reader cam levers 127, beginning with the uppermost one of the group, are successively operated so that a few needles of the HN2 group are added for reinforce knitting to the HN group at every third course, with consequent formation of the stepped side limit lines of the reinforced area until all of the needles of the groups HN2 are in use for reinforcing with the needles HN at the course C—C.

By another rotary shift of the main and supplemental timing drums 27 and 28 at the completion of the course C in Fig. 21, the stop 150 is actuated to retract the reader cam levers 127, and the guards 80 and 115 are moved to prevent further racking of the primary and auxiliary patterning drums 60 and 100 by the pawls 63 and 130. At the same time, clutch 26 is shifted to bring the machine into an oscillatory phase for the knitting of the heel pocket H of the stocking in the well-known way from a heel yarn supplied from another feed (not shown) substituted for the feeds 39 and 40 at the time of withdrawal of the latter as above explained. Upon completion of the heel pocket H, the clutch 26 is shifted back to its normal position for round and round knitting of the stocking instep I from the body yarn Y alone incident to which primary patterning drum 60 only is permitted to function, the fabric thus formed being like that of the leg portion L of the stocking above the advance or high heel reinforcement.

Having thus described my invention, I claim:

1. In a circular knitting machine, a grooved rotary cylinder containing a full complement of needles; knitting cams for actuating the needles in stitch formation; a main feed for feeding a body yarn; a second feed for feeding a splicing yarn; primary mechanism for controlling the needles such that in the formation of alternate fabric courses, all of the needles are caused to take and knit the body yarn, and that during the formation of intervening courses, individual needles at spaced intervals around the cylinder are caused to draw loops of the body yarn and to hold said loops with loops previously formed on them for tucking, while the remaining needles are caused to take and knit the body yarn; and auxiliary mechanism operative upon a predetermined subdivision of the full complement of needles such that in the formation of the alternate courses, all of the needles of the subdivision are caused to take and knit the splicing yarn with the body yarn, and that in the formation of the intervening courses the tuck needles within the aforesaid subdivision are each caused to tuck the body yarn but miss the splicing yarn.

2. A knitting machine according to claim 1, wherein the auxiliary mechanism also functions to add a few needles at a time to the opposite ends of the reinforcing group occasionally as the knitting proceeds.

3. In a circular stocking knitting machine, a grooved rotary cylinder containing a full complement of needles of which a definite group is used in heel pocket knitting; knitting cams for actuating the needles in stitch formation; a main feed for feeding a body yarn; a second feed for feeding a splicing yarn; mechanism for controlling the needles such that, in the formation of alternate fabric courses, all of the needles are caused to take and knit the body yarn, and that during the formation of the intervening courses, individual needles at spaced intervals around the cylinder are caused to take the body yarn to hold said loops with loops previously formed on them for tucking, while the remaining needles are caused to take and knit the body yarn; normally inactive auxiliary mechanism adapted to control the heel needles such that in the formation of alternate fabric courses, all of the heel needles are caused to take and knit the splicing yarn with the body yarn, and so that in the formation of the intervening courses, the tuck needles within the heel group are caused to tuck the body yarn but miss the splicing yarn; and means operative to start the auxiliary mechanism at a predetermined stage in the knitting of the stocking leg for the production of a reinforced advance or high heel area before knitting of the heel pocket is begun.

4. A circular stocking knitting machine according to claim 3, wherein the auxiliary mechanism serves to first select a mid group of the heel needles for the reinforcing for a definite time, and to thereafter add a few needles at a time to opposite ends of said mid group occasionally as the knitting proceeds until all of the heel needles are in action.

5. In a circular knitting machine, a main feed for feeding a body yarn; a second feed for feeding a splicing yarn at a higher level; a grooved rotary needle cylinder with individual selecting jacks beneath the needles in the cylinder grooves; knitting cams for actuating the needles in stitch formation; a jack lifting cam; patterning means for causing individual jacks at spaced intervals around the cylinder to bypass the lifting cam for maintenance of corresponding needles at tuck level while allowing the other jacks to be raised by the said cam for elevation of the corresponding needles to latch clearing level; and a special cam operative upon the latch-cleared needles enroute to the stitch point, to bring the latter needles to a level such that the body yarn will be taken by them but the splicing yarn will be missed by the needles, relegated as aforesaid to the tuck level, during the formation of alternate fabric courses.

6. In a circular knitting machine, a grooved rotary cylinder with a full complement of needles; knitting cams for actuating the needles in stitch formation; a main feed for feeding a body yarn; a second feed for feeding a splicing yarn; individual selecting jacks beneath the needles in the cylinder grooves; a jack lifting cam; an intermittently rotated primary patterning drum; reader cam levers controlled by said drum during the formation of alternate fabric courses to cause individual jacks at spaced intervals around the cylinder to bypass the lift cam for maintenance of corresponding needles at the tuck level at which they will take but not knit the body yarn, while allowing the other jacks to be raised by the lift cam for elevation of the corresponding needles to a level at which they will take and knit the body yarn; an auxiliary jack lifting cam adjacent the first mentioned jack lifting cam; an auxiliary intermittently rotated patterning drum; reader cam levers controlled by said auxiliary drum to cause the jacks corresponding to the needles previously selected for tucking to bypass the auxiliary lift cam and cause such needles to miss the splicing yarn, while allowing other jacks to overpass the auxiliary lift cam and elevate their needles to take and knit both the body yarn and the splicing yarn.

7. A circular stocking knitting machine according to claim 6, wherein the heel only needles are used for the reinforcing; and further including means for starting the auxiliary patterning drum at a predetermined stage in the knitting of the stocking leg for the production, by the heel needles, of a reinforced advance or high heel area before knitting of a heel pocket is begun.

8. A circular stocking knitting machine according to claim 6, wherein the heel needles only are used in the reinforcing; wherein the auxiliary patterning drum is instrumental in first causing selection of a mid group of heel needles for reinforcing for a definite time, and in thereafter causing occasional addition of a few needles to opposite ends of the mid group as the knitting proceeds until all of the heel needles are in use for reinforcing; and further including means for starting the auxiliary patterning drum at a predetermined stage in the knitting of the stocking leg and stopping it before knitting of a heel pocket is begun.

9. A circular stocking knitting machine according to claim 6, wherein the heel needles only are used for the reinforcing; and further including means for starting the auxiliary patterning drum at a predetermined stage in the knitting of the stocking leg for the production by the heel needles of a reinforced advance or high heel area before knitting of a heel pocket is begun; and further including means whereby the primary and auxiliary patterning drums are respectively provided with rings of ratchet teeth; and means whereby the primary drum is racked by a tooth at every other revolution of the needle cylinder, and whereby the auxiliary pattern drum is racked a tooth at every second rotation of the needle cylinder.

10. A circular stocking knitting machine according to claim 6, wherein the heel needles alone are used for the reinforcing; wherein the reader cam levers associated with the auxiliary drum are vertically arranged; wherein the selectors associated with the instep needles have butts all of a length vertically to be actuated by all of said reader cam levers; wherein the jacks corresponding to needles respectively beyond opposite ends of the instep needles have vertically shorter butts which are graduated as to size for actuation sequentially by said reader cam levers; and further including means for starting the auxiliary patterning drum at a predetermined stage in the knitting of the stocking leg for the production of an advance or high heel area with a parallel side edged upper portion, and with a gradually widened lower portion before knitting of a heel pocket is begun.

References Cited in the file of this patent

UNITED STATES PATENTS 2,108,540   Lochhead   Feb. 15, 1938